United States Patent [19]

Fuentes et al.

[11] Patent Number: 5,538,536
[45] Date of Patent: Jul. 23, 1996

[54] PROCESS AND APPARATUS FOR SEPARATION OF A GASEOUS MIXTURE BY SUCCESSIVE MEMBRANES OF DIFFERENT SELECTIVITIES

[75] Inventors: François Fuentes, Paris; Pierre-Olivier Dolle, Levallois-Perret; Antoine Willemot, Sceaux; Lionel Barry, Versailles; Frédéric Fillet, Issy les Moulineaux; Jean-Louis Gelot, Elancourt, all of France

[73] Assignee: L'Air Liquide, Societe Anonyme Pour L'Etude et l'Eploitation des Procedes Georges Claude, Paris Cedex, France

[21] Appl. No.: 420,341

[22] Filed: Apr. 11, 1995

[30] Foreign Application Priority Data

Sep. 12, 1994 [FR] France .................................. 94 10851

[51] Int. Cl.$^6$ ............................ B01D 53/22; B01D 71/64
[52] U.S. Cl. ............................ 95/45; 95/51; 95/52; 95/54; 95/47; 96/9
[58] Field of Search ............................ 95/39, 45, 47–55; 96/4, 7–10

[56] References Cited

U.S. PATENT DOCUMENTS

| | | | |
|---|---|---|---|
| 3,144,313 | 8/1964 | Pfefferle | 96/8 X |
| 4,119,417 | 10/1978 | Heki et al. | 96/7 |
| 4,140,499 | 2/1979 | Ozaki et al. | 96/7 |
| 4,264,338 | 4/1981 | Null | 96/8 X |
| 4,894,068 | 1/1990 | Rice | 95/51 |
| 5,071,451 | 12/1991 | Wijmans | 95/39 X |
| 5,102,432 | 4/1992 | Prasad | 96/9 X |
| 5,169,412 | 12/1992 | Prasad et al. | 95/47 |
| 5,240,471 | 8/1993 | Barbe et al. | 95/54 |
| 5,281,253 | 1/1994 | Thompson | 95/45 X |
| 5,282,726 | 2/1994 | Warren | 417/243 |
| 5,344,480 | 9/1994 | Schulte et al. | 96/7 X |
| 5,378,263 | 1/1995 | Prasad | 95/45 X |
| 5,383,957 | 1/1995 | Barbe et al. | 96/8 |
| 5,425,801 | 6/1995 | Prasad | 95/45 X |
| 5,429,662 | 7/1995 | Fillet | 96/4 X |

FOREIGN PATENT DOCUMENTS

| | | | |
|---|---|---|---|
| 0430304 | 6/1991 | European Pat. Off. | 95/52 |
| 62-286517 | 12/1987 | Japan | 96/9 |
| 63-143923 | 6/1988 | Japan | 95/50 |
| 2-131112 | 5/1990 | Japan | 96/7 |
| 4-180812 | 6/1992 | Japan | 95/51 |

*Primary Examiner*—Robert Spitzer
*Attorney, Agent, or Firm*—Young & Thompson

[57] ABSTRACT

Process and apparatus for the separation of at least one gas from an entering gaseous mixture (1), of the type in which a membrane separation is conducted with at least two successive membrane separators in the following manner: the entering mixture is passed through a first membrane separator (2) operating at a first operating temperature and all or a portion of the residual mixture (5) from this first membrane separator is passed through a second membrane separator (3) operating at a second operating temperature. A mixture enriched in the gas is obtained from the permeate outlet (6, 4) of each of these two separators. Two separators are used whose selectivities for the gas are different. These may be membranes of different type, or membranes of the same type, if the first operating temperature is different from the second operating temperature.

20 Claims, 3 Drawing Sheets

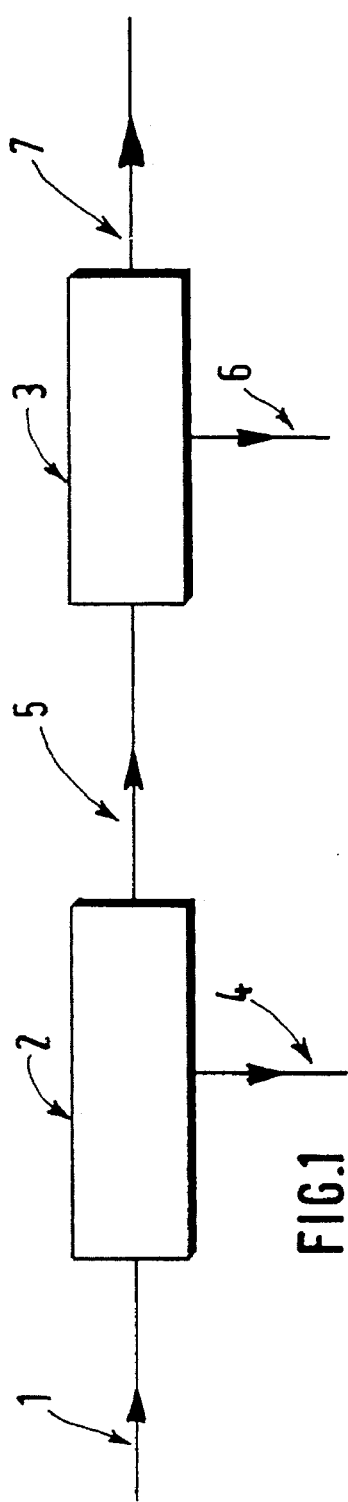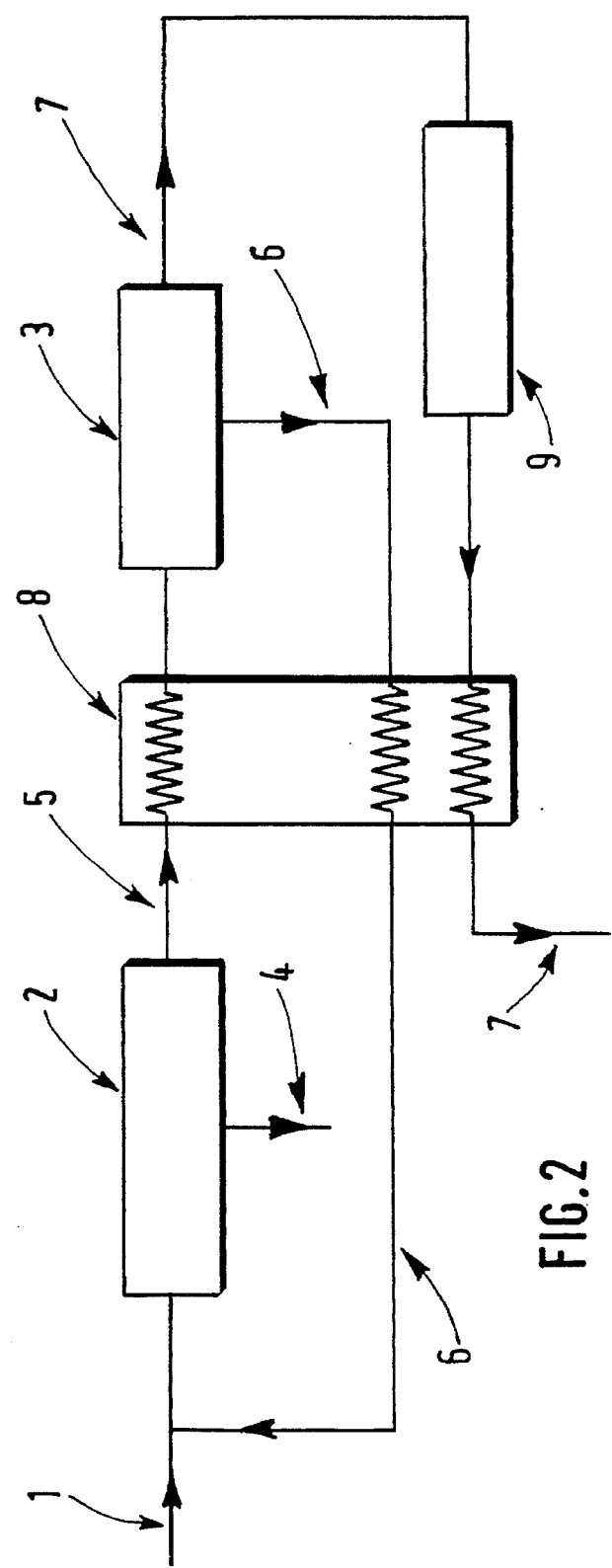
FIG.1
FIG.2

PROCESS AND APPARATUS FOR SEPARATION OF A GASEOUS MIXTURE BY SUCCESSIVE MEMBRANES OF DIFFERENT SELECTIVITIES

FIELD OF THE INVENTION

The invention relates to the production or separation of gas by membranes. The invention is particularly applicable to the case in which it is necessary to produce gases of high purity (for example nitrogen, hydrogen, . . . ) or to the case of the separation of hydrogen from a gaseous medium containing at least one of the gases of the group consisting of CO and hydrocarbons of the formula $C_xH_y$, such a gaseous medium coming for example from a steam reforming unit or from a refinery.

BACKGROUND OF THE INVENTION

The production of gas (particularly nitrogen) by membranes is considerably developed in recent years, everywhere in the world, complementarily to the conventional production by cryogenic means, because it has the following advantages:

Excellent supply reliability:

Low production cost;

The possibility of providing, at very attractive costs, according to the applications in question, of gases of suitable purity.

The principle is that, under the influence of a difference of partial pressure on opposite sides of the membrane, there is obtained on the permeate side a low pressure mixture enriched in the most permeable components and at the outlet of the membrane (also called the "residue" or "reject" side), a mixture at a pressure near the supply pressure (of the entering mixture) and which is enriched in the less permeable components.

There are thus used to produce nitrogen (often termed "impure") from air, semi-permeable membranes having good properties for the separation of oxygen from nitrogen (selectivity), for example of the polyimide type, the mixture enriched in oxygen being obtained on the permeate side. These membranes are often termed "nitrogen" membranes.

As to the production of hydrogen or CO, there is most often conducted a recovery from mixtures from certain industries, which are separated on semi-permeable membranes having good properties for the separation of hydrogen relative to other components of the mixture, for example of the polyaramide type, the mixture enriched in hydrogen being obtained on the permeate side, the mixture enriched as the case may be in hydrocarbons or in CO being obtained from the residue side of the membrane. These membranes are often called "hydrogen" membranes.

It is evident that the performances obtained will depend very largely on the conditions of use of the membrane, such as the temperature, the pressure of supply to the membrane, or the content of the supply mixture in the component which it is desired to remove from the permeate side.

As to temperature, it is also known that when increasing the temperature of operation of the membrane, most often the permeability and hence the productivity of the membrane will increase, but its selectivity (for example $O_2/N_2$) and hence the efficiency declines. Most often, the expression "temperature of operation of the membrane or of the membrane module" will be understood to mean the temperature obtained within the membrane or the module by virtue of the entering gas temperature which passes through it, with from time to time the supplemental intervention of an external heating system of the membrane module or of temperature maintenance (thermostatic enclosure).

Thus, according to the case, to obtain the required level of performances, the entering gas will be heated by several dozens of degrees, or the gas will be maintained at ambient temperature, or else in certain cases this gas will be cooled below the ambient temperature, or even below 0° C.

It will be recalled that, in the case of the production of nitrogen from air that the "output" of the membrane represents the proportion of nitrogen present in the entering mixture which is recovered at the outlet (residual) of the membrane, the $O_2/N_2$ selectivity of the membrane represents as to itself the ratio of the permeances (frequently also called permeabilities) of the oxygen and the nitrogen through the membrane (sel.=Perm ($O_2$) / Perm ($N_2$)). The same type of reasoning is applicable for "hydrogen" membranes, given that here, the reasoning must be reversed in terms of extraction outlet because it is sought to recover the permeate mixture enriched in hydrogen.

Whether it is for the conventional air gases (nitrogen, oxygen) or the production of CO and hydrogen, the difficulties encountered are essentially of three types:

the case in which it is necessary to produce high purity gases at a high flow rate (for example less than 0.1% residual impurities), while being competitive relative to the cryogenic production method or the preferential absorption method;

as to the production of CO or $H_2$, when they are obtained by recovery from materials rejected from industrial sites (the characteristics particularly of composition and flow rate of the entering mixture to be treated being in a restrictive way fixed by the industrial site producing the mixture to be treated): to produce with a good technico-economic compromise the purity of CO or of hydrogen required by the final utilization station;

in the case of the production of hydrogen from certain entering mixtures from refineries, whose heavy hydrocarbon concentration is high, and for which according to the hydrogen purity sought at the inlet, the permeate side extraction of a large portion of the hydrogen of the mixture, or even a portion of the light hydrocarbons, gives rise to an enrichment of the gas obtained on the residue side of the membrane in "heavy" constituents. This phenomenon leads to an elevation of the dew point of the residual gas relative to the dew point of the entering mixture and can thus give rise, according to the temperature of the operation of the membrane, to a hydrocarbon condensation, which is extremely deleterious to the polymer fibers which constitute the membrane.

As to the first production problem of high purity gas, it has been proposed (see particularly U.S. Pat. No. 4,894,068, U.S. Pat. No. 4,119,417, or U.S. Pat. No. 5,240,471) to conduct the separation in multistage installations, which permit a reduction of investment and of energy consumed, relative to a single stage process. These patents teach that it is then advantageous to effect a recycling of the permeates (or of the residues according to the gas which is sought) downstream relative to the inlets of the membranes disposed upstream, or else the sweeping of the permeate from one upstream stage by the permeate of a downstream stage.

Thus, considering the example of the production of nitrogen from air, the recycling of the downstream permeate toward the inlet of the upstream membrane, this downstream permeate being enriched in nitrogen relative to the entering air, permits reducing the concentration of oxygen in the entering mixture, and hence increasing the recovery of nitrogen at the outlet.

Comparative evaluations made by the applicant show that these solutions, if they represent progress relative to conventional one-stage methods, are still not sufficiently competitive, particularly as to the cost of operation, for the case in which it is necessary to produce large size units, for which these solutions cannot compete with the other category of gas production on site which is production by preferential adsorption with pressure variation (often called PSA).

As to the problem described above of the untimely condensation of hydrocarbons in the membrane, the general attitude adopted is to limit voluntarily the hydrogen extraction output, by using for example "hydrogen" membranes at a different temperature from that at which they show the best output, which represents a "misfit" penalty.

SUMMARY OF THE INVENTION

In this context, the object of the present invention is to provide an improved process for the membrane separation of a gas, from an entering gaseous medium (containing for example air or at least one gas of the group constituted by CO and hydrocarbons of the formula $C_xH_y$), permitting, as needed by the user:

supplying with a good technico-economic compromise, a high purity gas (for example nitrogen), supplying with a good technico-economic compromise, and from an entering mixture whose characteristics are fixed by the industrial site producing this entering mixture, a gas flow pure for example as to hydrogen or CO to the extent of the needs of the final utilization station, in the case of the separation of hydrogen from mixtures rich in heavy hydrocarbons, effecting this separation under good output conditions, with reduced risks of untimely condensation, which is damaging to the membrane.

The applicant has determined that it is possible to provide a solution to the group of problems recited above, by using at least two consecutive membrane separators, of different selectivity as to the element it is desired to separate on the permeate side (relative to the mixture treated in each separator), with, as the case may be (and hence the object that is sought) the selectivity of the first separator greater or less than that of the second separator. This different selectivity can be obtained according to the various modifications which will be described below, by the use of membranes of different qualities, or by the use of membranes of the same type but used under different operating conditions, particularly temperature.

There will be used in all that follows the simplified terminology "selectivity" of a membrane separator for a given gas, which will be taken to mean the selectivity of this separator as to the gas in question relative to the mixture treated in this separator (the selectivity being as indicated above a relative concept).

Thus, considering the first case of the production of a high purity gas, for example the production of nitrogen at high purity (for example less than 0.1% residual oxygen), the applicant has determined the fact that it is particularly advantageous to conduct an air separation in at least two stages, the operating temperature of the second stage being substantially less than that of the first membrane stage encountered by the air, the permeate of the second stage, which is enriched in nitrogen, being preferably recycled to the inlet of the first stage, so as to lower the oxygen concentration of the mixture to be treated in this first stage.

Considering the case of the production of a flow containing a concentration of CO or $H_2$ adapted to the needs of the final utilization station, from an entering mixture (for example from a refinery or a steam reforming unit) whose characteristics are necessarily fixed in a constraining manner by the industrial site at which the mixture in question is produced, the applicant has determined that it is most particularly advantageous to proceed in that case with a separation of the mixture in at least two stages, the hydrogen selectivity of the second stage being less than that of the first stage (there could for example be obtained such a situation by using in the first a polyaramide type fiber, and in the second a polyimide type fiber). This "mixed" solution has an incontestible advantage by its technico-economic compromise of supplying the concentration which the user desires (which is often intermediate between low and very high purities), from a fixed entering mixture, and with an excellent economic balance as to investment and cost of operation.

Considering now the case in which it is desired to recover hydrogen from mixtures very rich in heavy hydrocarbons, for which, given the purity of the hydrogen that is sought, the risks of condensation and hence of alteration of the membranes are very present, the applicant has determined that it is most particularly advantageous to proceed in this case to a separation of the mixture in at least two stages, the selectivity as to hydrogen in the second stage (second stage which is maintained at a second operating temperature), being greater than that of the first stage (first stage which is maintained at a first operating temperature), one could for example obtain such a situation by using in the first a polyimide type fiber and in the second a polyaramide type fiber.

Operation preferably takes place under these conditions in which the operating temperature of the first separation stage is lower than that of the second separation stage.

This "mixed" solution maximizes the extraction output of hydrogen, while minimizing the costs of investment and of operation, but ensures by an adequate choice of each stage, the elimination of all risk of condensation: the first stage which is of low selectivity but high productivity avoids too great impoverishment of the first residue in light elements, the second very selective stage treats but a fraction of the entering mixture.

It will be noted also that this mixed arrangement uses, in a paradoxical manner, less selective fibers where the driving force is the maximum (which is to say the inlet).

Thus, the process according to the invention, for membrane separation of at least one gas from an entering gaseous mixture, of the type in which a membrane separation is conducted in at least two successive membrane separators in the following manner: the entering mixture passes through a first membrane separator operating at a first operating temperature and all or a portion of the residual mixture from this first membrane separator passes through a second membrane separator operating at a second operating temperature, the mixture enriched in said gas being obtained at the permeate outlet of each of the two separators, is characterized in that two separators are used whose selectivities as to said gas are different.

By "membrane separator", there is meant according to the invention, a semi-permeable membrane or membrane module, as the case may be an assembly of several semi-permeable membranes (or membrane modules) mounted in parallel, having good properties for separation of the gas which it is desired to extract relative to the mixture entering the separator.

Thus, by way of example, there could be used for its properties for separating oxygen from an entering mixture of air, a membrane of the polyimide type, and for its properties for the separation of hydrogen from an entering mixture from a refinery a membrane of the polyaramide type.

There is meant by "operating temperature" according to the invention, the concept described above in the present application.

As the case may be, the difference of selectivity between the first separation stage and the second separation stage could be obtained by the use of different fibers, or else by identical fibers but used for example at different operating temperatures.

According to one of the aspects of the invention, the gas which it is desired to separate is hydrogen, and the entering gaseous mixture contains at least one of the gases of the group constituted by CO and hydrocarbons of the formula $C_xH_y$.

The process according to the invention could particularly be used for the production of CO, the entering gaseous mixture being comprised mostly of hydrogen and CO, such as that from a steam reforming unit, under conditions in which the selectivity as to hydrogen of the first membrane separator is greater than that of the second membrane separator.

The process according to the invention could also be practiced for the production of hydrogen, so as to supply two utilization stations requiring two hydrogen streams of different characteristics, the entering gaseous medium being comprised mostly of hydrogen and hydrocarbons, such as that from a refinery, under conditions in which the selectivity as to hydrogen of the first membrane separator is greater than that of the second membrane separator, and in which there is directed toward the two utilization stations, the two mixtures enriched in hydrogen obtained at the permeate outlet of the two membrane separators.

The process according to the invention could also be practiced for the production of hydrogen to supply a single utilization station, the entering gaseous mixture here being comprised mostly of hydrogen and hydrocarbons, such as that from a refinery, again under conditions in which the selectivity as to hydrogen of the first membrane separator is greater than that of the second membrane separator, the two mixtures enriched in hydrogen obtained at the permeate outlet of the two separators being reunited into a single stream, which is then directed toward the utilization station in question.

According to another way of practicing the invention, the entering gaseous mixture is comprised mostly of hydrogen and heavy hydrocarbons, such as that from a refinery, the process of the invention being then practiced under conditions in which the selectivity as to hydrogen of the first membrane separator is lower than that of the second membrane separator, and the dew point temperature of the gaseous mixture obtained on the residue side of the first separator is less than the operating temperature of the first separator, and the dew point of the gaseous mixture obtained on the residual side of the second separator is lower than the operating temperature of the second separator. The first operating temperature is then preferably lower than or equal to the second operating temperature.

According to another aspect of the invention, the process is practiced so as to obtain high purity nitrogen, the entering mixture is then air, the two separation stages using membranes of the same type, and the first operating temperature is greater by at least 20° C. than the second operating temperature, preferably greater by at least 40° C., the nitrogen content of the gaseous mixture obtained on the residue side of the second membrane separator being greater than 99% by volume, preferably greater than 99.5% by volume, and most preferably greater than 99.9% by volume.

The mixture obtained on the permeate side of the second separation stage, which is enriched in nitrogen (relative to the entering air) is then preferably recycled to the inlet of the first separation stage, so as to lower the oxygen content of the entering mixture to be treated.

As will become clearly apparent to one skilled in the art, the process described above for high purity nitrogen is applicable more generally to any separation requiring a high enrichment in one of the constituents of the mixture.

As described above, the process according to the invention therefore provides in certain cases effecting a substantial cooling of the residual mixture from the first separation stage, before its arrival at the second separation stage.

It is to be noted that this large cooling can be provided in total safety in this cascade of separators because the gas from the first stage is generally very dry (dew point of −60° C., even −70° C.).

Such a cooling operation can then for example be effected by conventional means such as mechanical cold, heat exchange with cryogenic liquid, or again expansion through a turbine.

But the applicant has provided a particularly advantageous method to effect this cooling operation, which consists in injecting water in the form of a spray into the very dry permeate from the second separation stage, giving rise to the evaporation of all or a portion of this water in the permeate (because of the existing margin relative to the saturation point), this endothermic evaporation "pumping" a portion of the energy of the permeate, which gives rise to a reduction of the temperature of this permeate. This permeate stream thus cooled is then sent to a gas exchanger comprising at least two paths, in which it exchanges cold with the residue from the first separation stage.

It is moreover possible, and preferable, to control the flow of water injected into the second permeate by the temperature of the entering mixture in the second separator.

Such a cooling method by injection of sprayed water, if it has already been used for cooling compressed air at the outlet of a compressor (as described in EP-A-524435) represents here an altogether attractive and effective cooperation between the phenomenon of water evaporation, which is energy consuming and the multi-stage of separation producing a second stage permeate which is very dry, giving rise to an important operating margin before reaching saturation with water.

It involves first of all an operating cost and investment which is incomparably lower than that of the methods cited above and conventionally used in the field of membrane separation, the water representing a "cold" source that is virtually free.

This cooling method which has been described in the case of a double membrane separation stage can also be effectively used in the case of a single separation stage, to cool the entering mixture.

As will be clearly apparent to one skilled in the art, in all the cases mentioned above, the entering mixture, before its arrival at the first separation stage, is subjected to an operation which is conventional in this field of membrane separation, of conditioning, permitting performing such operations as deoiling, filtering, drying or bringing to the desired temperature of the mixture.

BRIEF DESCRIPTION OF THE DRAWINGS

Other characteristics and advantages of the present invention will become apparent from the following description of embodiments given by way of illustration but in no way limiting, with respect to the accompanying drawings, in which:

FIG. 1 is a schematic representation of a two-stage installation for practicing the process according to the invention;

FIG. 2 is a schematic representation of a two-stage installation for the practice of the process according to the invention, so as to obtain from an entering mixture of air, high purity nitrogen.

DETAILED DESCRIPTION OF THE INVENTION

Figure 3:
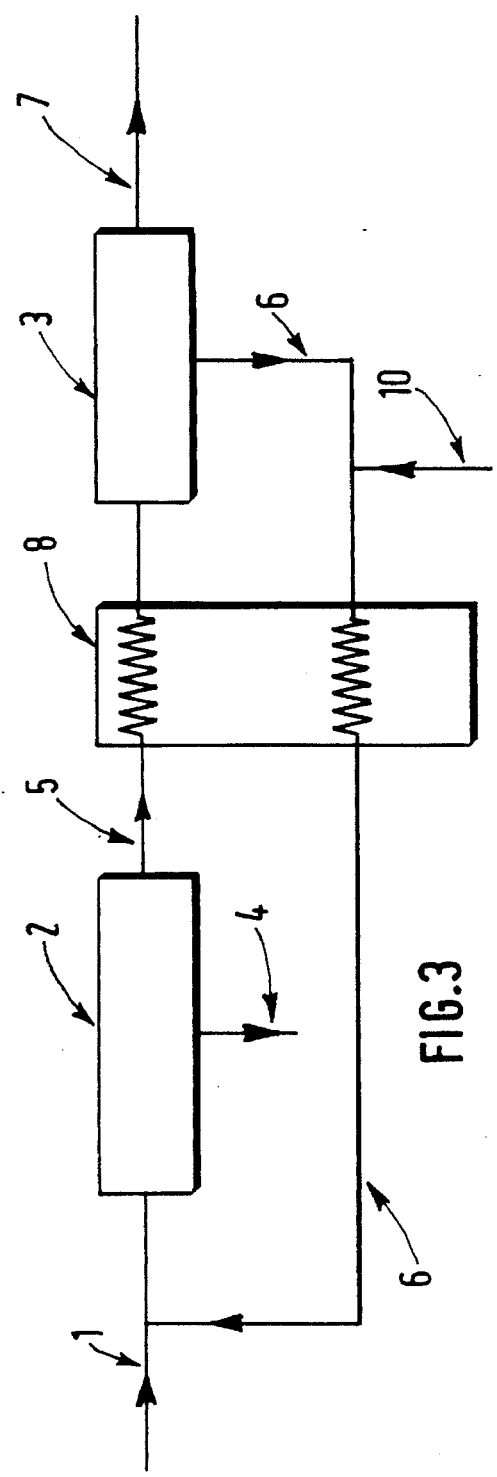
FIG. 3 is a schematic representation of a two-stage installation for practicing the process of the invention, so as to obtain, from an entering mixture of air, high purity nitrogen, using cooling by injection of water into the permeate from the second separation stage.

There is seen in FIG. 1 a first membrane separator 2, supplied by an entering mixture 1, the possible step of conditioning the mixture 1 before its arrival at the separator 2 having not been shown.

The separator 2 produces at its permeate side a gaseous mixture 4, and at its residual side a gaseous mixture 5, directed, in the illustrated embodiment, in its entirety to the inlet of the second separator 3, which in its turn produces on the permeate side a gaseous mixture 6, and on the residual side a gaseous mixture 7.

As shown further in the examples, according to the entering mixture treated and the desired object in terms of composition of the exiting mixture 7, the two membrane separators 2 and 3 could be of different types, with the choice of increasing or decreasing selectivity, or else membrane separators of the same type but with different operating temperatures.

FIG. 2 shows the case of an installation suitable for practicing the process according to the invention, in the case in which it is desired to produce a gaseous mixture 7 of high nitrogen purity, from an entering mixture 1 which is air. The two separators 2 and 3 are thus, for the illustrated example, of the same type, for example of the polyimide type, the operating temperature of the separator 2 being substantially greater than that of the second separator 3.

The air compressor and the step of conditioning the entering gas before its arrival at the first stage (comprising steps such as drying, filtering, deoiling or bringing to the desired gas temperature) have not been shown in FIG. 2.

The gaseous mixture 6 obtained on the permeate side of the second separator is in this case recycled to the inlet of separator 2, preferably upstream of the air compressor.

There is shown in FIG. 2 a heat exchanger 8, used to cool the gaseous mixture 5, the gaseous mixture 6, which is colder, yielding its cold in the exchanger before its arrival at the inlet of separator 2, the gaseous mixture 7 with a high nitrogen content, passes through a cooler (for example of the cryogenic type) before giving up its cold in exchanger 8, before its arrival at the final utilization station (which utilization station is not shown in FIG. 2).

FIG. 2 illustrates but one of numerous modifications of embodiment of the double operation of cooling the residue from the first stage of separation/reheating and recycling the permeate from the second stage. There could also be envisaged the following solutions, not shown but described here by way of illustration:

the exchanger 8 has but two passages, one for cooling the residue 5 and the other for the residue 7 which there gives up its cold after passage through the cooler;

another solution in which the cooler 9 is disposed between the exchanger 8 and the separator 3, the residue 5 being therefore cooled, after its passage through the exchanger 8, which is a three-passage exchanger, the two other passages being used for recycling the permeate 6 toward the inlet of the first stage and for the residue 7 which there gives up its cold before being directed toward the final utilization station;

another solution is a modification of the preceding solution, in which the residue 7 does not pass through the exchanger which is then a two-passage exchanger;

there can also be envisaged a solution without the exchanger 8, with the presence of a simple cooler on the path of the residue 5 between the two separators 2 and 3, the permeate 6 being then recycled directly to the inlet of the first stage, without an intermediate stage, whilst the residue 7 is directly sent to the utilization station.

Figure 4:
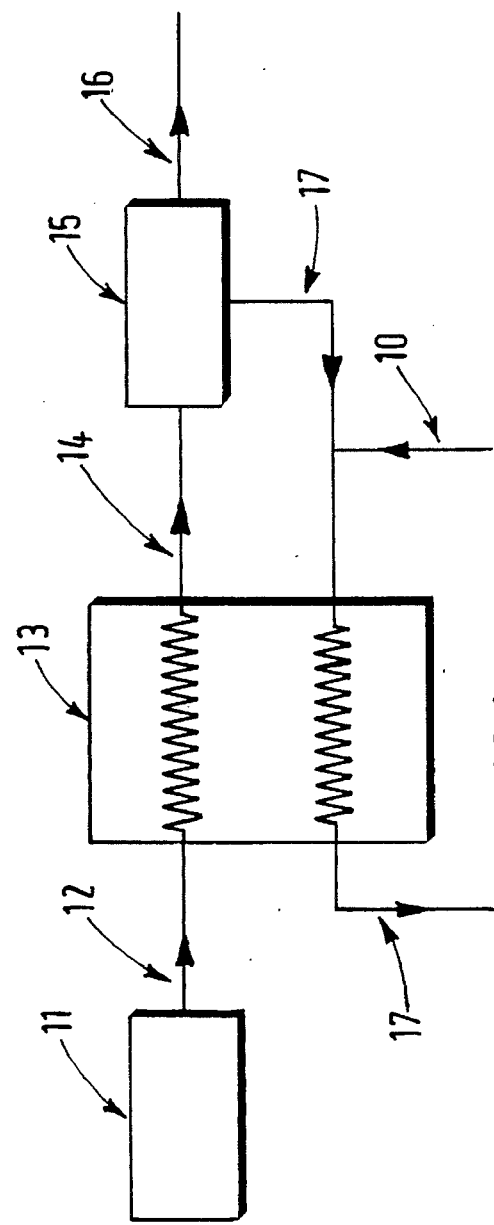
FIG. 4 shows an example of the use of the cooling method by water injection in the case of a single stage of membrane separation.

FIGS. 3 and 4 show two installations for practicing cooling by water injection:

FIG. 3 applied to the invention in the case of a double separation stage so as to obtain a residue 7 of high purity nitrogen;

FIG. 4, more generally, used for a single separation stage.

There is thus shown in FIG. 3 the exchanger 8, with two passages, one for the residue 5, the other for the permeate 6 into which has been injected, before its arrival in the exchanger, water 10 by spraying, the water injected into the very dry permeate from the separator 3 then evaporates, entirely or in part (the evaporation can take place as the case may be in the exchanger), giving rise to the cooling of the permeate 6, which thus exchanges its cold in the exchanger 8 before being recycled to the inlet of the first stage.

FIG. 4 shows the more general case of the use of this cooling method in the case of a single membrane separation stage 15, at which arrives for example air 12 from an assembly 11 (for compression and conditioning) after having passed through a two-passage exchanger, the other passage being reserved for the permeate 17, cooled by water injection 10, which thus gives up its cold in exchanger 13 before being externally discharged or else used at a utilization stage that needs a superoxygenated mixture.

FIG. 4 thus illustrates the case in which it is desired to cool a mixture for example to ambient temperature or below, before its arrival 14 at a membrane separator. This arrangement more particularly relates to the case in which it is desired to produce a gas 16 by single stage separation, this gas being of high purity with a high output.

Figure 5:
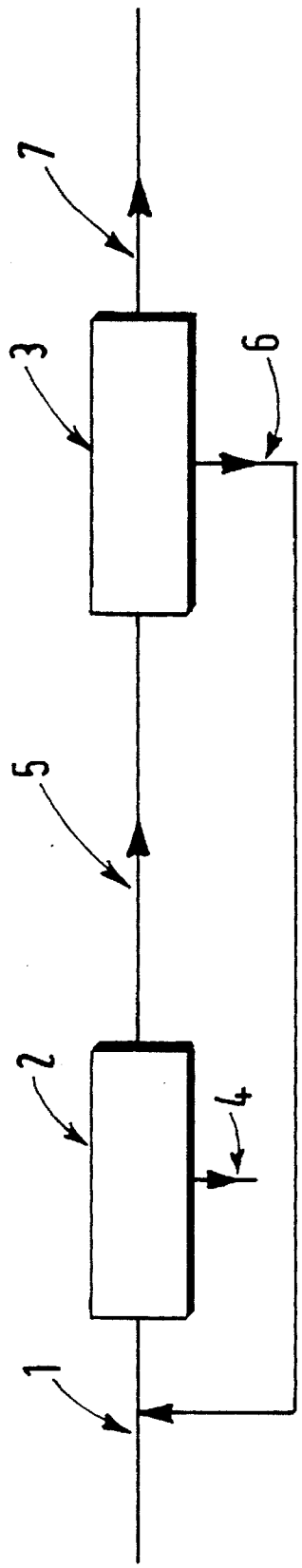
FIGS. 5 and 6 show two prior art installations in the field of membrane production of nitrogen from air, corresponding to the use of two identical separation stages, with respective recycling of the permeate from the second stage to the inlet of the first stage, and a sweeping of the permeate of the first stage using the permeate of the second stage.
Figure 6:
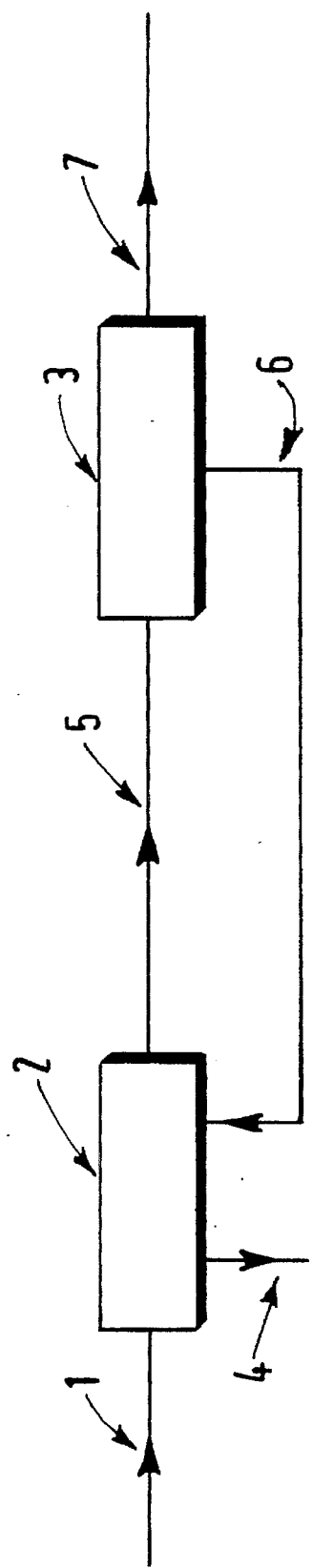

FIGS. 5 and 6 show two prior art installations in the field of membrane production of nitrogen from air, corresponding to the use of two identical separation stages 2 and 3, with respectively in the first case, a recycling of the permeate 6 from the second stage 3 to the inlet of the first stage 2, and in the second case, a sweeping of the permeate 4 of the first stage 2 using permeate 6 from the second stage 3.

An installation such as that illustrated in FIG. 2 has been tested for the production of a flow of $Nm^3/h$ of nitrogen containing a residual oxygen content of 0.1% by volume, from an entering mixture of air.

Table I collects the results of three examples of operation of a double separation stage, using membranes of the polyimide type, the second column of the table showing a comparative example in which a single separation stage is used:

Comparative Example:
a single stage of polyimide membrane, operating temperature: 45° C.;
membrane surface used: 100

Example No. 1A:
operating temperature of the first stage =45° C., operating temperature of the second stage =5° C.;
the two stages use the same membrane surface (Surf1= Surf2)

recycling of the second permeate to the inlet of the first stage

Example No. 2B:
double stage polyimide, operating at 45° C., the two stages using the same membrane surface;
sweeping of the first permeate with the second permeate It will be seen from a reading of this table that the saving in compression is minimal, and not compensated by the small decrease of membrane surface used, which as indicated above has, for such proportions, only a small influence on overall capital cost.

Tables III and IV (Examples 3A and 3B being according to the prior art, and Examples 4A and 4B according to the invention) present the same type of comparative study as that presented by Tables I and II, but this time with the production of a flow rate of 100 $Nm^3/h$ of nitrogen containing a residual oxygen concentration of 0.5% by volume, from an entering mixture of air.

TABLE I

| 100 $Nm^3/h$ of nitrogen at 0.1% $O_2$ | Comparative Example one stage T = 45° C. | According to the invention: Example 1A 2 stages with recycling Surf. 2 = Surf. 1 T1 = 45° C.; T2 = 5° C. | According to the invention: Example 1B 2 stages with recycling Surf. 2 = 2 × Surf. 1 T = 45° C.; T2 = 5° C. | According to the invention: Example 1C 2 stages with recycling Surf. 2 = 4 × Surf. 1 T = 45° C.; T2 = 5° C. |
|---|---|---|---|---|
| Membrane surface | 100 | 103 | 110 | 122 |
| Flow rate to be compressed | 100 | 72 | 64 | 58 |

Example No. 1B:
operating temperature of the first stage =45° C., operating temperature of the second stage =5° C.;
the second stage uses twice as much membrane surface as the first stage (Surf2 =2 ×Surf1)

Example No. 1C:
operating temperature of the first stage =45° C., operating temperature of the second stage =5° C.;
the second stage uses four times as much membrane surface as the first stage (Surf2 =4 ×Surf1)

It will thus be seen from the presented results that relative to the comparative example which represents a base of 100, both for the surface of the membrane used and for the flow rate to be compressed (hence the compression energy used), example No. 1 A gives, for a comparable membrane surface, a saving of the flow rate to be compressed of nearly 30%, Example 1 B gives, for an increase of membrane surface of scarcely 10% (which gives rise to only a small increase in overall capital cost of the installation), a saving of the flow rate to be compressed of more than 35%.

Example 1 C confirms this tendency with a gain as to compression of more than 40%.

By way of comparison, Table II gives the results obtained in the case of two prior art installations (FIGS. 5 and 6), again with respect to the same base 100 of the single stage at 45° C.:

Example No. 2A:
double stage polyimide, operating at 45° C., the two stages using the same membrane surface;

TABLE II

| 100 $Nm^3/h$ of nitrogen at 0.1% $O_2$ | Comparative Example one stage T = 45° C. | According to the prior art: Example 2A 2 stages with recycling (FIG. 5) Surf. 2 = Surf. 1 T = 45° C. | According to the prior art: Example 2B 2 stages with sweeping (FIG. 6) Surf. 2 = Surf. 1 T = 45° C. |
|---|---|---|---|
| Membrane surface | 100 | 89 | 94 |
| Flow rate to be compressed | 100 | 86 | 94 |

TABLE III

| 100 $Nm^3/h$ of nitrogen at 0.5% $O_2$ | Comparative Example one stage T = 45° C. | According to the prior art: Example 3A 2 stages with recycling (FIG. 5) Surf. 2 = Surf. 1 T = 45° C. | According to the prior art: Example 3B 2 stages with sweeping (FIG. 6) Surf. 2 = Surf. 1 T = 45° C. |
|---|---|---|---|
| Membrane surface | 100 | 95 | 98 |
| Flow rate to be compressed | 100 | 92 | 98 |

TABLE IV

| 100 Nm³/h of nitrogen at 0.5% O₂ | Comparative Example one stage T = 45° C. | According to the invention: Example 4A 2 stages with recycling Surf. 2 = Surf. 1 T1 = 45° C.; T2 = 5° C. | According to the invention: Example 4B 2 stages with recycling Surf. 2 = 2 × Surf. 1 T = 45° C.; T2 = 5° C. |
|---|---|---|---|
| Membrane surface | 100 | 117 | 129 |
| Flow rate to be compressed | 100 | 82 | 76 |

These two tables confirm all the conclusions already established as to the purity of 0.1%.

Table V shows a modification of the previously discussed results in the framework of Examples 1A to 1C (Table I) but in which this time, the temperature difference between the two stages is only 20° C. (Examples 5 and 5B).

An installation as described in the framework of FIG. 1 has been tested for the production of two gaseous streams of different hydrogen concentrations, from an entering mixture from a refinery: a stream of at least 99.5% hydrogen and another stream of at least 90% hydrogen.

Table VI shows the results of Example 6A, comparative, showing a double separation stage using membranes of the polyaramide type, at an operating temperature for each stage of 90° C.:

In column No. 1, the composition of the gas to be treated, in columns 2, 3, 4 and 5 the hydrogen concentrations respectively of the permeate of the first stage, of the residual mixture from the first stage and injected into the second separation Stage, of the permeate produced by this second stage and of the residual mixture obtained at the outlet of the second stage;

the number of overall membrane modules used constitutes a base 100 (37% of these modules are in the first stage, 63% of these modules are in the second stage);

the two last lines of the table give the flow rate and pressure of each mixture treated or obtained (entering, permeate first stage, etc . . . )

The displayed results show, for the base 100 of modules used, a rate of overall recovery (the two permeates) of hydrogen of about 89%.

Table VII gives the results of Example 6B, comparative, using a double separation stage using this time membranes of the polyimide type, at an operating temperature for each stage of 70° C.:

As for example No. 6A, in column No. 1, the composition of the gas to be treated, in columns 2, 3, 4 and 5 the concentrations of hydrogen respectively of the permeate of the first stage, of the residual mixture from the first stage and injected into the second separation stage, of the permeate produced by this second stage and of the residual mixture obtained at the outlet of the second stage;

the number of overall membrane modules used here constitutes the same base 100 as in Example 6A (but here, 63% of these modules are in the first stage, 37% of these modules are in the second stage);

the two last lines of the table give the flow rate and the pressure of each mixture treated or obtained (entering, permeate first stage, etc . . . )

TABLE V

| 100 Nm³/h of nitrogen at 0.1% O₂ | Comparative Example one stage T = 45° C. | According to the invention: Example 5A 2 stages with recycling Surf. 2 = Surf. 1 T1 = 45° C.; T2 = 25° C. | According to the invention: Example 5B 2 stages with recycling Surf. 2 = 2 × Surf. 1 T = 45° C.; T2 = 25° C. |
|---|---|---|---|
| Membrane surface | 100 | 93 | 98 |
| Flow rate to be compressed | 100 | 76 | 70 |

TABLE VI

Example 6A

| Composition | 1 Gas to be treated | 2 Permeate first stage | 3 Residue first stage | 4 Permeate second stage | 5 Residue second stage |
|---|---|---|---|---|---|
| $H_2$ | 80.80% | 99.66% | 51.86 | 95.34% | 31.56% |
| $CH_4$ | 11.00% | | | | |
| $C_2H_6$ | 5.00% | | | | |
| $C_3H_8$ | 2.00% | | | | |
| $C_4$ | 1.00% | | | | |
| $C_5$ | 0.10% | | | | |
| $C_6$ | 0.10% | | | | |
| Flow rate (Nm³/h) | 20000 | 12000 | 8000 | 2500 | 5500 |
| Pressure (bar) | 30 | 10 | 28 | 10 | 27 |

TABLE VII

Example 6B

| Label Composition | 1 Gas to be treated | 2 Permeate first stage | 3 Residue first stage | 4 Permeate second stage | 5 Residue second stage |
|---|---|---|---|---|---|
| $H_2$ | 80.80% | 98.49% | 51.79% | 91.68% | 33.98% |
| $CH_4$ | 11.00% | | | | |
| $C_2H_6$ | 5.00% | | | | |
| $C_3H_8$ | 2.00% | | | | |
| $C_4$ | 1.00% | | | | |
| $C_5$ | 0.10% | | | | |

TABLE VII-continued

Example 6B

| Label Composition | 1 Gas to be treated | 2 Permeate first stage | 3 Residue first stage | 4 Permeate second stage | 5 Residue second stage |
|---|---|---|---|---|---|
| $C_6$ | 0.10% | | | | |
| Flow rate ($Nm^3/h$) | 20000 | 12500 | 7500 | 2300 | 5200 |
| Pressure (bar) | 30 | 10 | 29 | 10 | 28 |

The results presented show, for the same base 100 of modules used, an overall recovery rate (the two permeates) of hydrogen of about 89%, but the hydrogen content obtained in the first permeate is lower than the sought limit of 99.5%.

Table VIII shows the results of Example 7, according to the invention, showing a double mixed stage of separation using membranes of polyaramide type in the first stage (at an operating temperature of 90° C.), and membranes of the polyimide type in the second stage (at an operating temperature of 70° C.):

- the table shows the same column and line arrangement as the two preceding tables;
- the number of overall membrane modules used here is 87 relative to the base 100 of the two preceding tables (43% of these modules are in the first stage, 57% of these modules are in the second stage);

The results presented show that the objectives required in terms of hydrogen concentration of the two permeate streams are achieved, with a recovery rate of hydrogen (about 89%) comparable to that which was obtained in the two preceding comparative examples, but with a saving of 13% of the modules used.

Tables IX, X and XI, concerning the production of a stream of CO containing less than 1% hydrogen, from an inlet gas from a steam reforming operation.

Tables IX and X, compared with the invention, give the result of a separation effected with a single stage of membrane separation:

- Table IX (Example 8A): a base 100 of number of modules, of the polyaramide type, at an operating temperature of 90° C.;
- Table X (Example 8B): relative to the preceding base 100, the use here of 80 modules of polyimide type, at an operating temperature of 70° C.;

The results of Table IX show that the object is achieved with a recovery rate of about 80%, in return, in the case of Table X, the objective is achieved in terms of concentration but with a very low recovery rate which is only of the order of 31%.

It is to be noted, to obtain with these modules of polyimide type a recovery rate comparable to that obtained in Table IX, it would be necessary to use only 40 modules of the polyimide type (instead of 80), but in this case, the hydrogen content of the CO produced would be about 23%, which is much higher than the 1% limit sought.

TABLE VIII

Example 7

| Composition | 1 Gas to be treated | 2 Permeate first stage | 3 Residue first stage | 4 Permeate second stage | 5 Residue second stage |
|---|---|---|---|---|---|
| $H_2$ | 80.80% | 99.66% | 51.86% | 90.40% | 32.41% |
| $CH_4$ | 11.00% | | | | |
| $C_2H_6$ | 5.00% | | | | |
| $C_3H_8$ | 2.00% | | | | |
| $C_4$ | 1.00% | | | | |
| $C_5$ | 0.10% | | | | |
| $C_6$ | 0.10% | | | | |
| Flow rate ($Nm^3/h$) | 20000 | 12000 | 8000 | 2600 | 5400 |
| Pressure (bar) | 30 | 10 | 28 | 10 | 27 |

TABLE IX

Example 8A

| Label Composition | 1 Gas to be treated | 2 Permeate | 3 CO produced |
|---|---|---|---|
| $H_2$ | 74.12% | 92.24% | 0.84% |
| CO | 24.86% | 7.41% | 95.45% |
| $CO_2$ | 0.20% | | |
| $CH_4$ | 0.35% | | |
| $N_2$ | 0.47% | | |
| Flow rate ($Nm^3/h$) | 12000 | 9500 | 2500 |
| Pressure (bar) | 25 | 2 | 24 |

TABLE X

Example 8B

| Label Composition | 1 Gas to be treated | 2 Permeate | 3 CO produced |
|---|---|---|---|
| $H_2$ | 74.12 | 81.86% | 0.62% |
| CO | 24.86% | 17.61% | 93.75% |
| $CO_2$ | 0.20% | | |
| $CH_4$ | 0.35% | | |
| $N_2$ | 0.47% | | |
| Flow rate ($Nm^3/h$) | 12000 | 11000 | 1000 |
| Pressure (bar) | 25 | 2 | 24 |

TABLE XI

Example 9

| Label Composition | 1 Gas to be treated | 2 Permeate first stage | 3 Residue first stage | 4 Permeate second stage | 5 CO produced |
|---|---|---|---|---|---|
| $H_2$ | 74.12% | 96.90% | 7.48% | 17.83% | 0.96% |
| CO | 24.86% | 2.91% | 89.06% | 80.02% | 94.76% |
| $CO_2$ | 0.20% | | | | |
| $CH_4$ | 0.35% | | | | |
| $N_2$ | 0.47% | | | | |
| Flow rate ($Nm^3/h$) | 12000 | 9000 | 3000 | 1100 | 1900 |
| Pressure (bar) | 25 | 2 | 24 | 2 | 23 |

Table XI shows the results obtained according to the invention in an example of operation No. 9, by separation in a double mixed stage (FIG. 1):

the entering mixture is the same as that treated in the two preceding examples;

the overall number of modules used =75 (relative to the base 100 of Example 8A), 60% of these modules are of the polyaramide type and are in the first stage (operating temperature: 90° C.) and 40% of these modules are of the polyimide type and are in the second stage (operating temperature: 70° C.);

The results obtained show that the objective in terms of concentration is achieved, with a recovery rate of the order of 60%, the overall number of modules used being less than that used in each of the two preceding examples. The use of a double mixed stage therefor permits in this case adjusting the capital cost incurred to the actual purity requirement of CO.

Tables XII and XIII relate this time to the recovery of hydrogen, with a high objective for purity and recovery, from a mixture of the refinery type, containing a high concentration of heavy hydrocarbons.

The examples of operation of the installation of FIG. 1 reported in the two tables (Examples 10A and 10B) have been effected under the following conditions:

Example 10A:

in the first stage, the modules of polyimide type operate at a temperature of 70° C., and in the second stage, the modules of polyaramide type operate at a temperature of 90° C., the upper part of the table compares the results obtained according to the invention with the single stage purely polyimide solution (base 100 of capital cost) or purely polyaramide solution (capital cost 386 relative to the preceding base 100), the mixed solution according to the invention thus representing a capital cost of 370.

the first column of the table gives the characteristics of the entering mixture (composition, flow rate, temperature, dew point, and pressure), the following columns giving the same information for different mixtures obtained;

The results obtained by this Example 10A show for the combination of the two permeates a recovery rate of the order of 94%, a hydrogen purity of nearly 96%.

On the other hand, this separation effected in a double mixed stage permits avoiding any risk of recondensation of the heavy hydrocarbons in the membrane modules because at each stage, the dew point of the residual mixture is lower than the operating temperature of the stage.

TABLE XII

Example 10A

|  | Membranes of polyimide type | Membranes of polyaramide type | Mixed solution of the invention |
|---|---|---|---|
| Recovery $H_2$ | 86.6% | 94.4% | 94.4% |
| Purity $H_2$ | 98.2% | 96.1% | 95.7% |
| Capital cost | 100 | 386 | 370 |
| Steam Consumption | 100 | 157 | 117 |

|  | Gas to be treated 1 | Residue I 2 | Permeate I 3 | Interstage 4 | Residue II 5 | Permeate II 6 |
|---|---|---|---|---|---|---|
| $H_2$ | 79.10% | 35.01% | 98.19% | 35.01% | 20.11% | 74.31% |
| $CH_4$ | 11.00% | 32.98% | 1.49% | 32.98% | 38.21% | 0.58% |
| $C_2H_6$ | 5.00% | 16.07% | 0.21% | 16.07% | 20.89% | 19.19% |
| $C_3H_8$ | 2.10% | 6.81% | 0.06% | 6.81% | 8.89% | 3.38% |
| $C_4H_{10}$ | 1.00% | 3.25% | 0.02% | 3.25% | 4.25% | 1.34% |

TABLE XII-continued

Example 10A

| $C_5H_{12}$ | 0.90% | 2.94% | 0.02% | 2.94% | 3.83% | 0.64% |
|---|---|---|---|---|---|---|
| $C_6H_{14}$ | 0.90% | 2.94% | 0.02% | 2.94% | 3.84% | 0.58% |
| Flow rate $Nm^3/h$ | 20000 | 6000 | 14000 | 6000 | 4400 | 1600 |
| Temperature °C. | 35 | 70 | 70 | 90 | 90 | 90 |
| Dew point °C. | 35 | 69 | −52 | 69 | 78 | 3 |
| Pressure bar abs | 30 | 29.9 | 10 | 29.8 | 29.7 | 10 |

TABLE XIII

Example 10B

|  | Membranes of polyimide type | Membranes of polyaramide type | Mixed solution of the invention |
|---|---|---|---|
| Recovery $H_2$ | 86.6% | 87.5% | 88.3% |
| Purity $H_2$ | 98.2% | 99.0% | 98.4% |
| Capital cost | 100 | 259 | 249 |
| Steam Consumption | 100 | 100 | 100 |

|  | Gas to be treated 1 | Residue I 2 | Permeate I 3 | Interstage 4 | Residue II 5 | Permeate II 6 |
|---|---|---|---|---|---|---|
| $H_2$ | 79.10% | 62.46% | 99.17% | 62.46% | 32.60% | 97.07% |
| $CH_4$ | 11.00% | 19.55% | 0.69% | 19.55% | 34.44% | 2.30% |
| $C_2H_6$ | 5.00% | 9.07% | 0.09% | 9.07% | 16.61% | 0.33% |
| $C_3H_8$ | 2.10% | 3.82% | 0.03% | 3.82% | 7.00% | 0.13% |
| $C_4H_{10}$ | 1.00% | 1.82% | 0.01% | 1.82% | 3.34% | 0.06% |
| $C_5H_{12}$ | 0.90% | 1.64% | 0.01% | 1.64% | 3.01% | 0.06% |
| $C_6H_{14}$ | 0.90% | 1.64% | 0.01% | 1.64% | 3.01% | 0.06% |
| Flow rate $Nm^3/h$ | 20000 | 11000 | 9000 | 11000 | 5800 | 5200 |
| Temperature °C. | 35 | 70 | 70 | 70 | 70 | 70 |
| Dew point °C. | 35 | 51 | −61 | 51 | 69 | −36 |
| Pressure bar abs | 30 | 29.9 | 10 | 29.8 | 29.7 | 10 |

Example 10B:

in the first stage, the modules of polyimide type operate at a temperature of 70° C., in the second stage, the modules of the polyaramide type operate this time at the same temperature of 70° C., the upper part of the table compares the results obtained according to the invention with the purely polyimide single stage solution (base 100 for capital cost, which must be considered as different from the base 100 of Example 10A) or purely polyaramide single stage solution (capital cost 259 relative to the purely polyimide base 100), the mixed solution according to the invention then representing a capital cost of 249.

the first column of the table here gives again the characteristics of the entering mixture (composition, flow rate, temperature, dew point and pressure), the following columns giving the same information for the different mixtures obtained;

The results obtained in the framework of this example 10B show for the combination of the two permeates a recovery rate of the order of 88%, a hydrogen purity of more than 98%. On the other hand, this separation effected by a double mixed stage here permits again avoiding any risk of recondensation of the heavy hydrocarbons in the membrane modules because at each stage, the dew point of the residual mixture is below the operating temperature of the stage.

Although the present invention has been described in relation to particular embodiments, it is not thereby limited but on the contrary is susceptible of modifications and variations which will be apparent to one skilled in the art in the framework of the following claims.

We claim:

1. In a process for the separation of at least one gas from an entering gaseous mixture, wherein a membrane separation is conducted with at least two successive membrane separators, said process comprising: passing an entering mixture through a first of said at least two successive membrane separators, said first membrane separator operating at a first operating temperature and passing at least a portion of a residual mixture from said first membrane separator through a second of said at least two membrane separators, said second membrane separator operating at a second operating temperature, and obtaining a mixture enriched in said gas from a permeate outlet of each of these two separators; the improvement which comprises using as the first and second membrane separators, two separators whose selectivities for said gas are different.

2. Process according to claim 1, wherein there is used for the first and second separators membranes of different type.

3. Process according to claim 1, wherein there is used for the first and second separators membranes of the same type, and said first operating temperature is different from said second operating temperature.

4. Process according to claim 3, wherein said first operating temperature is higher than said second operating temperature, and the residual mixture from the first membrane separator is cooled, before its arrival at the second membrane separator, by passage through an exchanger with at least two passages, wherein through a second passageway of the exchanger is passed a permeate mixture obtained on the permeate outlet of the second separator, and into which permeate mixture water has been sprayed before its arrival at said exchanger.

5. Process according to claim 4, wherein said exchanger is an exchanger with at least three passages, the third passage being used for the passage of the residual mixture from the second separator.

6. Process according to claim 3, wherein the entering mixture is air, and said first operating temperature is higher by at least 20° C. than said second operating temperature, the nitrogen concentration of the gaseous mixture obtained on the residual side of the second membrane separator being greater than 99% by volume.

7. Process according to claim 1, wherein the selectivity for said gas of the first membrane separator is greater than the selectivity for said gas of the second membrane separator.

8. Process according to claim 7, wherein the membrane of the first membrane separator is made of polyaramide and the membrane of the second membrane separator is made of polyimide.

9. Process according to claim 1, wherein the selectivity for said gas of the first membrane separator is lower than the selectivity for said gas of the second membrane separator.

10. Process according to claim 1, wherein said gas is hydrogen, and said gaseous medium contains at least one of the gases of the group constituted by CO and hydrocarbons.

11. Process according to claim 10, wherein said gaseous medium is mostly comprised by hydrogen and hydrocarbons, and wherein the dew point of the gaseous mixture obtained on a residual side of the first separator is below said first operating temperature, and the dew point of the gaseous mixture obtained on a residual side of said second separator is lower than said second operating temperature.

12. Process according to claim 11, wherein said first operating temperature is no higher than said second operating temperature.

13. Process according to claim 11, wherein the membrane of the first membrane separator is made of polyimide and the membrane of the second membrane separator is made of polyaramide.

14. Process according to claim 1, for the production of CO, wherein said gaseous mixture is mostly comprised by hydrogen and CO.

15. Process according to claim 1, for the production of hydrogen, so as to supply two utilization stations requiring two hydrogen streams of different characteristics, wherein said gaseous mixture is mostly comprised by hydrogen and hydrocarbons, and wherein there are directed toward the two utilization stations, two mixtures enriched in hydrogen obtained at the permeate outlet of the two membrane separators.

16. Process according to claim 1, for the production of hydrogen for the supply of a utilization station, wherein said gaseous mixture is mostly comprised of hydrogen and hydrocarbons, and wherein the mixtures enriched in hydrogen obtained at the permeate outlet of the two separators are reunited in a single stream, which is then directed to said utilization station.

17. Apparatus for the separation of gas, for the supply of a utilization station with gas, comprising:

a first membrane separator having a first selectivity for said gas, a second membrane separator having a second selectivity for said gas higher than said first selectivity, and a cooling system for gas, disposed in one of the following locations:

a) along a conduit connecting a residual outlet of the first separator to an inlet of the second separator;

b) along a conduit connecting a residual outlet of the second separator to the utilization station of said gas;

c) along a conduit connecting a permeate outlet of the second separator to a inlet of the first separator.

18. Apparatus according to claim 17, wherein the cooling system is disposed along the conduit connecting the residual outlet of the first separator to the inlet of the second separator, said apparatus further comprising an exchanger having passages and being so located that one of the passages of the exchanger is used to pass a residual mixture from the first separator between the first separator and the cooling system, the other passages being used to pass a permeate mixture from the second separator to the inlet of the first separator, and to pass a residual mixture from the second separator to the utilization station.

19. Apparatus according to claim 17, wherein the cooling system is disposed along the conduit connecting the residual outlet of the second separator to the utilization station of the gas, said apparatus further comprising an exchanger having passages and being so located that one of the passages of the exchanger is used to pass a residual mixture from the second separator between the cooling system and the utilization station, the other passages of the exchanger being used to pass a residual mixture from the first separator between the first separator and the second separator, and a permeate mixture from the second separator to the inlet of the first separator.

20. Apparatus according to claim 17, wherein the cooling system is disposed along the conduit connecting the permeate outlet of the second separator to the inlet of the first separator, said apparatus further comprising an exchanger having passages, said cooling system comprising means for injecting water into a permeate mixture from the second separator, the permeate mixture into which has been injected the water passing then through one of the passages of the exchanger, before reaching the inlet of the first separator, the other passages of the exchanger being used to pass a residual mixture from the first separator between the first separator and the second separator, and to pass a residual mixture from the second separator between the second separator and the utilization station.

* * * * *